United States Patent
Furuno et al.

(10) Patent No.: US 6,931,772 B2
(45) Date of Patent: Aug. 23, 2005

(54) HYDRAULIC SHOVEL WORK AMOUNT DETECTION APPARATUS, WORK AMOUNT DETECTION METHOD, WORK AMOUNT DETECTION RESULT DISPLAY APPARATUS

(75) Inventors: Yoshinori Furuno, Tsuchiura (JP); Takao Kurosawa, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/492,400

(22) PCT Filed: Oct. 16, 2002

(86) PCT No.: PCT/JP02/10709
§ 371 (c)(1),
(2), (4) Date: Apr. 13, 2004

(87) PCT Pub. No.: WO03/033829
PCT Pub. Date: Apr. 24, 2003

(65) Prior Publication Data
US 2005/0000703 A1 Jan. 6, 2005

(30) Foreign Application Priority Data
Oct. 18, 2001 (JP) .................................. 2001-321071

(51) Int. Cl.⁷ ............................. E02F 5/02; G06R 19/00
(52) U.S. Cl. ............................................ 37/348; 701/50
(58) Field of Search .......................... 701/50; 172/2–11; 37/348, 403, 414; 342/357.1, 357.17; 414/694, 699

(56) References Cited
U.S. PATENT DOCUMENTS 6,247,538 B1 * 6/2001 Takeda et al. ................ 172/2
6,363,632 B1 * 4/2002 Stentz et al. ................ 37/414
6,711,838 B2 * 3/2004 Staub et al. ................. 37/348
6,728,619 B2 * 4/2004 Adachi et al. ............... 701/50

FOREIGN PATENT DOCUMENTS

| JP | 60-102436 | 6/1985 |
|---|---|---|
| JP | 6-10378 | 1/1994 |
| JP | 7-259137 | 10/1995 |
| JP | 62-274223 | 11/1997 |
| JP | 2000-204606 | 7/2000 |
| JP | 2001-91345 | 4/2001 |

* cited by examiner

Primary Examiner—Robert E Pezzuto
(74) Attorney, Agent, or Firm—Mattingly, Stanger, Malur & Brundidge, P.C.

(57) ABSTRACT

During transfer of a material by a hydraulic excavator, load computing means periodically computes the weight of the material in a bucket of the excavator. Average value computing means computes an average value of weights of the material including a currently computed weight and a predetermined number of weights computed prior to the currently computed weight (M6), and standard deviation computing means computes, based on the average value, a standard deviation of the weights of the material (M7). True load value determining means selects a minimum standard deviation from among the standard deviations computed by the standard deviation computing means from the start of the transfer of the material to a different location until the end of the transfer of same, and judges the average value based on which the minimum standard deviation was computed, to be a true value of the weight of the material (M10, M11).

10 Claims, 13 Drawing Sheets

HYDRAULIC SHOVEL WORK AMOUNT DETECTION APPARATUS, WORK AMOUNT DETECTION METHOD, WORK AMOUNT DETECTION RESULT DISPLAY APPARATUS

TECHNICAL FIELD

The present invention relates to a work amount detection device and method and work amount detection result display device for a hydraulic excavator, and more particularly, to a device and method for detecting the work amount of a hydraulic excavator used at a mine or the like for loading dump trucks with mineral ore etc., and a device for displaying the results of detection of the work amount of such a hydraulic excavator.

BACKGROUND ART

A hydraulic excavator used at a mine etc. operates in the following manner: When a dump truck is stopped near the hydraulic excavator, the excavator scoops mineral ore or earth/sand from an excavation spot with a bucket thereof, swings by means of a revolving superstructure thereof to move the bucket to a position above the vessel of the dump truck, and then releases and loads the scooped mineral ore or earth/sand onto the vessel. Then, to again load the dump truck with mineral ore or earth/sand, the hydraulic excavator swings toward the excavation spot by means of the revolving superstructure. The hydraulic excavator repeats the above sequence of operations several times to load the vessel of the dump truck with a predetermined amount of mineral ore or earth/sand. After the loading is completed, the dump truck transports the mineral ore or earth/sand to a prespecified location.

While the loading is performed, a mine supervisor or the like needs to measure the amounts of loads placed on dump trucks by the hydraulic excavator, in order to manage the output of the mineral ore or earth/sand. The task is easy if dump trucks are equipped with movable load meters, but many of dump trucks do not have such load meters. Also, it is difficult to estimate the amount of load from the capacity of the vessel, because the vessel capacity varies depending on the types of dump trucks. Thus, with dump trucks alone, it is not easy to measure loads placed thereon.

Conventionally, when measuring the amount of mineral ore or earth/sand loaded onto a dump truck by a hydraulic excavator, the operator of the excavator operates a measurement button immediately before the mineral ore or earth/sand is loaded onto the dump truck, to measure the weight of the mineral ore or earth/sand.

There have also been proposed techniques for automatically measuring the weight of mineral ore or earth/sand scooped in the bucket. For example, Unexamined Japanese Patent Publication No. H06-10378 discloses a technique whereby a load in the bucket detected before the bucket is operated or swung is regarded as the load amount. Unexamined Japanese Patent Publication No. H07-259137 discloses a technique whereby a load in the bucket detected when the swing speed of the arm is lower than a fixed speed and at the same time the swing speed of the boom is higher than a fixed speed is regarded as the load amount. Also, Unexamined Japanese Patent Publication No. S62-274223 discloses a technique whereby cylinder oil pressures detected before and after the bucket reaches a predetermined height are averaged and a load in the bucket calculated from the average oil pressure is regarded as the load amount.

However, the aforementioned conventional method and the techniques disclosed in the publications are associated with problems. Namely, even in cases where the load in the bucket is unstable because of accelerating/decelerating operation of the boom or the arm or due to other factors, the load in the bucket is measured automatically or in response to operation of the measurement button, with the result that the amount of mineral ore or earth/sand loaded onto a dump truck cannot be measured with accuracy.

Also, the techniques disclosed in Unexamined Japanese Patent Publication No. H07-259137 and Unexamined Japanese Patent Publication No. S62-274223 are associated with a problem that the measurement itself cannot be achieved when predetermined conditions (predetermined swing speed, predetermined bucket height) are not fulfilled.

If the amount of mineral ore or earth/sand loaded onto dump trucks cannot be measured with accuracy, then it is not possible to accurately manage the output of the mineral ore or earth/sand.

DISCLOSURE OF THE INVENTION

An object of the present invention is to provide a work amount detection device and method and a work amount detection result display device for a hydraulic excavator whereby the weight of mineral ore or earth/sand loaded onto a dump truck can always be measured with accuracy, thus permitting accurate management of the output of the mineral ore or earth/sand.

To achieve the object, there is provided a work amount detection device for a hydraulic excavator which scoops a material with a bucket thereof and transfers the material to a different location, wherein the work amount detection device comprises: transfer start detecting means for detecting start of the transfer of the material to the different location; transfer end detecting means for detecting end of the transfer of the material to the different location; load computing means for periodically computing weight of the material in the bucket during the transfer; average value computing means for computing an average value of weights of the material periodically computed by the load computing means, the weights of the material including a currently computed weight and a predetermined number of weights computed prior to the currently computed weight; standard deviation computing means for computing, based on the average value computed by the average value computing means, a standard deviation of the weights of the material including the currently computed weight and the predetermined number of weights computed prior to the currently computed weight; and true load value determining means for selecting a minimum standard deviation from among the standard deviations computed by the standard deviation computing means from the start of the transfer of the material to the different location until the end of the transfer of same, and judging the average value based on which the minimum standard deviation was computed, to be a true value of the weight of the material.

Thus, in the work amount detection device for a hydraulic excavator, the weight of the material in the bucket is periodically computed by the load computing means during the transfer of the material. In addition, the average value computing means computes an average value of weights of the material including a currently computed weight and a predetermined number of weights computed prior to the currently computed weight, and based on the average value, the standard deviation computing means computes a standard deviation of the weights of the material including the currently computed weight and the predetermined number of weights computed prior to the currently computed weight.

The true load value determining means selects a minimum standard deviation, from among the standard deviations computed by the standard deviation computing means from the start of the transfer of the material to a different location until the end of the transfer of the material, and judges the average value based on which the minimum standard deviation was computed, to be a true value of the weight of the material.

It is therefore possible to extract, as a true value of the weight of the material, the weight of the material computed during a period in which the standard deviation of detected weights is a minimum and thus the weight of the material is stable while the material is transferred to a different location. Accordingly, the weight of the material can always be measured with accuracy in an appropriate manner irrespective of movements (boom moving speed, arm moving speed, bucket height, etc.) of the hydraulic excavator, thus permitting accurate management of the output of mineral ore or earth/sand as the material.

There is also provided a work amount detection device for a hydraulic excavator which scoops a material with a bucket thereof and transfers the material to a transportation vehicle, wherein the work amount detection device comprises: teaching means for teaching a position for the transportation vehicle; transportation vehicle detecting means for detecting the transportation vehicle when the transportation vehicle is located at the position taught by the teaching means; transfer start detecting means for detecting start of the transfer of the material to the transportation vehicle; transfer end detecting means for detecting end of the transfer of the material to the transportation vehicle; load computing means for periodically computing weight of the material in the bucket during the transfer; average value computing means for computing an average value of weights of the material periodically computed by the load computing means, the weights of the material including a currently computed weight and a predetermined number of weights computed prior to the currently computed weight; standard deviation computing means for computing, based on the average value computed by the average value computing means, a standard deviation of the weights of the material including the currently computed weight and the predetermined number of weights computed prior to the currently computed weight; and true load value determining means for selecting a minimum standard deviation from among the standard deviations computed by the standard deviation computing means from the start of the transfer of the material to the transportation vehicle until the end of the transfer of same, and judging the average value based on which the minimum standard deviation was computed, to be a true value of the weight of the material.

Also with this work amount detection device for a hydraulic excavator, it is possible to extract, as a true value of the weight of the material, the weight of the material computed during a period in which the standard deviation of detected weights is a minimum and thus the weight of the material is stable while the material is transferred to the transportation vehicle, and accordingly, the weight of the material can always be measured with accuracy in an appropriate manner irrespective of movements (boom moving speed, arm moving speed, bucket height, etc.) of the hydraulic excavator. Moreover, the teaching means teaches a position for the transportation vehicle, and the transportation vehicle detecting means detects the transportation vehicle when the vehicle is located at the taught position, thus permitting reliable loading of the material onto the transportation vehicle. In cases where the material is transported using transportation vehicles, therefore, the actual output of mineral ore or earth/sand as the material can be managed with accuracy.

In the work amount detection device, the transfer start detecting means may detect, as the start of the transfer, completion of scooping of the material with the bucket, and the transfer end detecting means may detect, as the end of the transfer, bucket dump operation.

Thus, it is possible to obtain standard deviations of detected weights of the material over the longest possible transfer period, that is, from the completion of scooping of the material with the bucket (end of excavation) to the dumping (release) of the material out of the bucket, whereby a true value of the weight of the material can be determined based on weights detected over a wide range.

There is also provided a work amount detection method for a hydraulic excavator which scoops a material with a bucket thereof and transfers the material to a different location, wherein the work amount detection method comprises: a transfer start detecting step of detecting start of the transfer of the material to the different location; a transfer end detecting step of detecting end of the transfer of the material to the different location; a load computing step of periodically computing weight of the material in the bucket during the transfer; an average value computing step of computing an average value of weights of the material periodically computed in the load computing step, the weights of the material including a currently computed weight and a predetermined number of weights computed prior to the currently computed weight; a standard deviation computing step of computing, based on the average value computed in the average value computing step, a standard deviation of the weights of the material including the currently computed weight and the predetermined number of weights computed prior to the currently computed weight; and a true load value determining step of selecting a minimum standard deviation from among the standard deviations computed in the standard deviation computing step from the start of the transfer of the material to the different location until the end of the transfer of same, and judging the average value based on which the minimum standard deviation was computed, to be a true value of the weight of the material.

Thus, according to the work amount detection method for a hydraulic excavator, the weight of the material in the bucket is periodically computed in the load computing step during the transfer of the material. In addition, an average value of weights of the material including a currently computed weight and a predetermined number of weights computed prior to the currently computed weight is calculated in the average value computing step, and based on the average value, a standard deviation of the weights of the material including the currently computed weight and the predetermined number of weights computed prior to the currently computed weight is computed in the standard deviation computing step. Then, in the true load value determining step, a minimum standard deviation is selected from among the standard deviations computed in the standard deviation computing step from the start of the transfer of the material to a different location until the end of the transfer of the material, and the average value based on which the minimum standard deviation was computed is judged to be a true value of the weight of the material.

Accordingly, the weight of the material can always be measured with accuracy in an appropriate manner, making it possible to manage with accuracy the output of mineral ore or earth/sand as the material, like the above work amount detection device.

In the work amount detection method, completion of scooping of the material with the bucket may be detected in the transfer start detecting step as the start of the transfer, and bucket dump operation may be detected in the transfer end detecting step as the end of the transfer.

This permits a true value of the weight of the material to be determined based on weights detected over a wide range, as in the above work amount detection device.

There is also provided a work amount detection result display device for a hydraulic excavator which comprises, in addition to the individual elements of the work amount detection device, weight display means for displaying at least an integrated value of the true values determined by the true load value determining means over a predetermined period.

This makes it easy for the operator of the hydraulic excavator to confirm an accurate weight of the material transferred over the predetermined period.

In the work amount detection result display device, the weight display means may display an integrated value of the true values determined by the true load value determining means over a period from the time an engine ignition key of the hydraulic excavator is turned ON until the engine ignition key is turned OFF.

This makes it easy for the operator of the hydraulic excavator or a supervisor to confirm an accurate weight of the material transferred during each work shift period.

There is also provided a work amount detection result display device for a hydraulic excavator which scoops a material with a bucket thereof and transfers the material to a transportation vehicle, wherein the work amount detection result display device comprises: teaching means for teaching a position for the transportation vehicle; transportation vehicle detecting means for detecting the transportation vehicle when the transportation vehicle is located at the position taught by the teaching means; transfer start detecting means for detecting start of the transfer of the material to the transportation vehicle; transfer end detecting means for detecting end of the transfer of the material to the transportation vehicle; load computing means for periodically computing weight of the material in the bucket during the transfer; average value computing means for computing an average value of weights of the material periodically computed by the load computing means, the weights of the material including a currently computed weight and a predetermined number of weights computed prior to the currently computed weight; standard deviation computing means for computing, based on the average value computed by the average value computing means, a standard deviation of the weights of the material including the currently computed weight and the predetermined number of weights computed prior to the currently computed weight; true load value determining means for selecting a minimum standard deviation from among the standard deviations computed by the standard deviation computing means from the start of the transfer of the material to the transportation vehicle until the end of the transfer of same, and judging the average value based on which the minimum standard deviation was computed, to be a true value of the weight of the material; and weight display means for displaying at least an integrated value of the true values determined by the true load value determining means over a period for which the transportation vehicle located at the taught position is continuously detected by the transportation vehicle detecting means.

This permits the operator of the hydraulic excavator to confirm with ease an accurate weight of the material, that is, the amount of load, which has been transferred to each transportation vehicle, thus making it possible to prevent overloading.

In the work amount detection result display device, the transfer start detecting means may detect, as the start of the transfer, completion of scooping of the material with the bucket, and the transfer end detecting means may detect, as the end of the transfer, bucket dump operation.

This permits a true value of the weight of the material to be determined based on weights detected over a wide range, as in the aforementioned work amount detection device and method.

In the work amount detection result display device, the weight display means may additionally display the average value of the weights of the material computed by the average value computing means.

This makes it easy for the operator of the hydraulic excavator to confirm also the weight of the material being transferred.

BEST MODE OF CARRYING OUT THE INVENTION

An embodiment of the present invention will be hereinafter described with reference to FIGS. 1 through 10.

Figure 1:
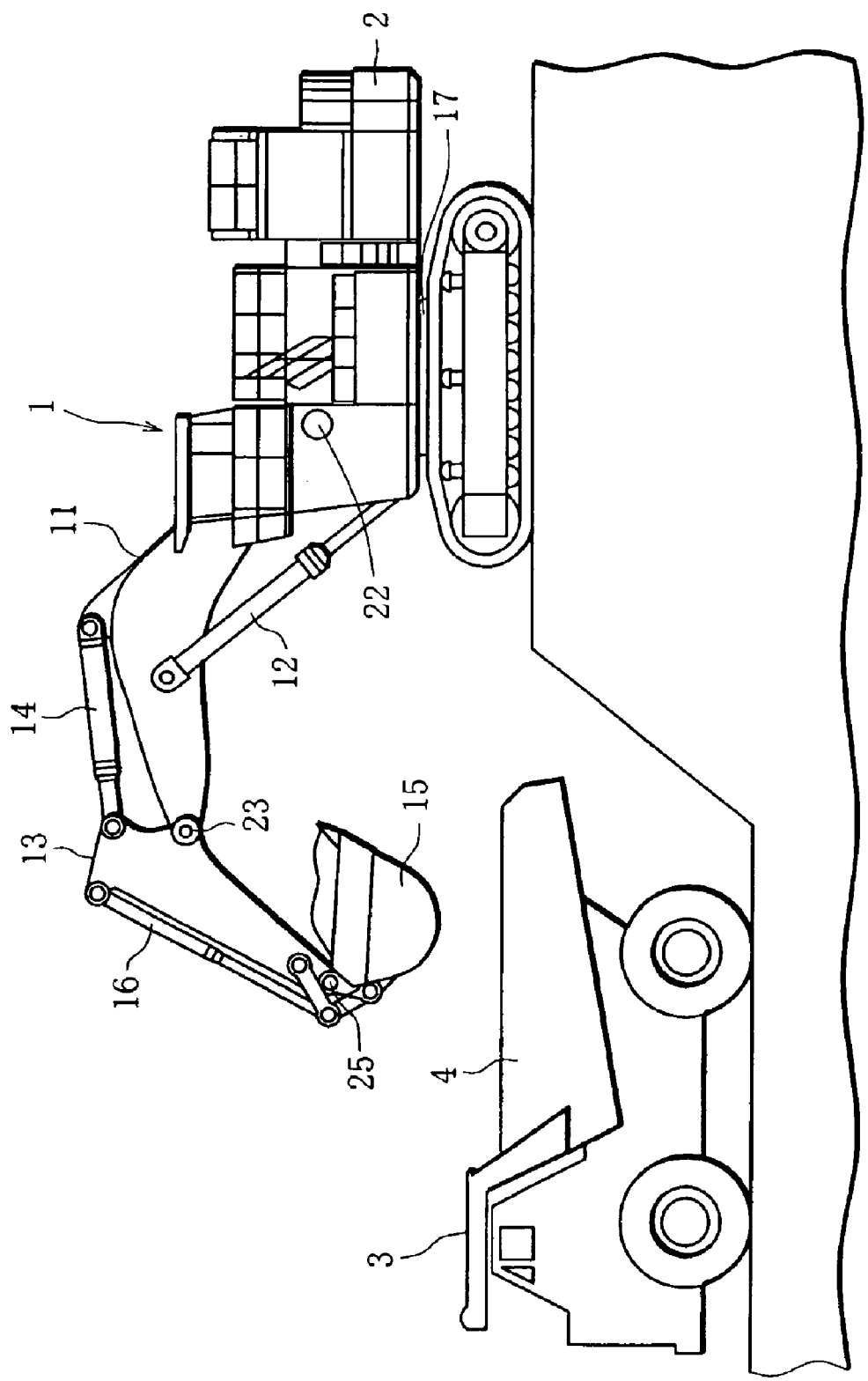
FIG. 1 is a view exemplifying a manner of how a hydraulic excavator equipped with a device of the present invention is operated at a work site such as a mine.

FIG. 1 exemplifies a manner of operation of a hydraulic excavator 1 equipped with a device according to the present invention.

In the figure, reference numeral 11 denotes a boom mounted to a revolving superstructure 2 of the hydraulic excavator 1, 12 denotes boom cylinders for raising and lowering the boom 11, 13 denotes an arm, 14 denotes an arm cylinder for swinging the arm 13, 15 denotes a bucket, and 16 denotes a bucket cylinder for swinging the bucket. Reference numeral 17 denotes a swing device for swinging the revolving superstructure 2 rightward and leftward.

When a dump truck 3 is stopped in front of the hydraulic excavator 1 constructed as above, the bucket 15 is operated to scoop mineral ore or earth/sand from an excavation spot, not shown, the revolving superstructure 2 is swung to move the bucket 15 to a release range, that is, a position above a vessel 4 of the dump truck 3, and the mineral ore or earth/sand is loaded onto the vessel 4. Then, to again load the mineral ore or earth/sand, the revolving superstructure 2 of the hydraulic excavator 1 is swung toward the excavation spot. The hydraulic excavator 1 repeats this sequence of operations several times, to load the vessel 4 of the dump truck 3 with a predetermined amount of mineral ore or earth/sand. After the loading is completed, the dump truck 3 transports the mineral ore or earth/sand to a given location.

Figure 2:
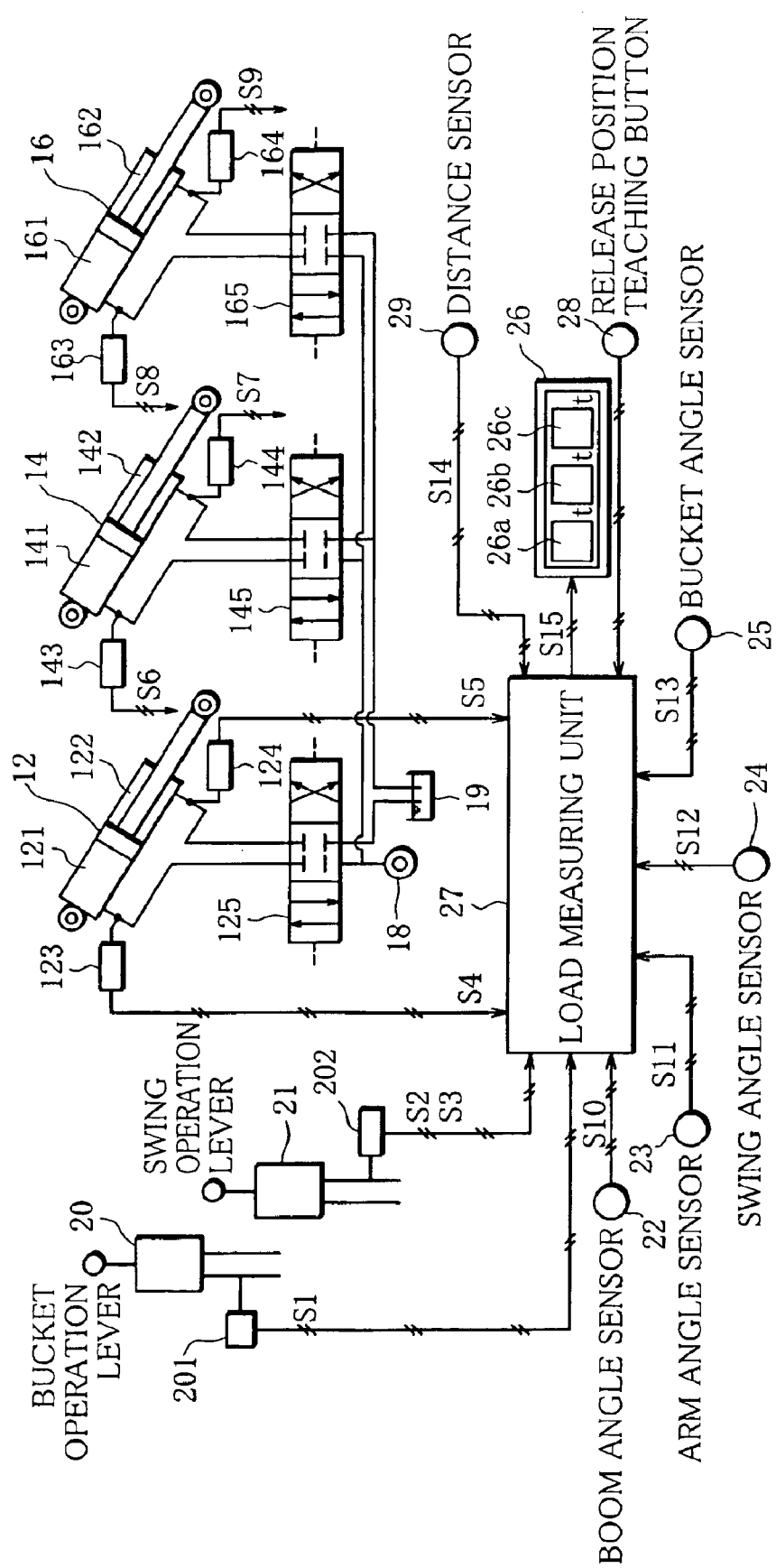
FIG. 2 is a block diagram showing a work amount detection device for a hydraulic excavator according to the present invention.

FIG. 2 is a block diagram showing a work amount detection device for a hydraulic excavator according to the present invention.

In the figure, reference numeral 121 denotes a bottom chamber of the boom cylinder 12, 122 denotes a rod chamber of the boom cylinder 12, 123 denotes a pressure sensor for measuring the pressure of pressure oil in the bottom chamber 121, 124 denotes a pressure sensor for measuring the pressure of pressure oil in the rod chamber 122, 18 denotes a hydraulic pump for the hydraulic excavator 1, 19 denotes an operating oil tank, and 125 denotes a selector valve inserted between the hydraulic pump 18 and the boom cylinder 12.

Reference numeral 141 denotes a bottom chamber of the arm cylinder 14, 142 denotes a rod chamber of the arm cylinder 14, 143 denotes a pressure sensor for measuring the pressure of pressure oil in the bottom chamber 141, 144 denotes a pressure sensor for measuring the pressure of pressure oil in the rod chamber 142, and 145 denotes a selector valve inserted between the hydraulic pump 18 and the arm cylinder 14.

Also, reference numeral 161 denotes a bottom chamber of the bucket cylinder 16, 162 denotes a rod chamber of the bucket cylinder 16, 163 denotes a pressure sensor for measuring the pressure of pressure oil in the bottom chamber 161, 164 denotes a pressure sensor for measuring the pressure of pressure oil in the rod chamber 162, and 165 denotes a selector valve inserted between the hydraulic pump 18 and the bucket cylinder 16.

Reference numeral 20 denotes a bucket operation lever and 21 denotes a swing operation lever. As the bucket operation lever 20 is operated, the selector valve 165 is switched to actuate the bucket cylinder 16.

Reference numeral 201 denotes a sensor for detecting an operation of the bucket operation lever 20 in a direction to cause dumping operation of the bucket 15, and 202 denotes a sensor for detecting a direction of operation (right swing or left swing) of the swing operation lever 21. The sensors 201 and 202 may be sensors for detecting voltage etc. in the case where the bucket operation lever 20 and the swing operation lever 21 are of electric lever type, and may be pressure sensors or pressure switches in the case where the levers 20 and 21 are of hydraulic pilot type.

Reference numeral 27 denotes a load measuring unit for computing the weight of a load (material) scooped with the bucket 15, such as mineral ore or earth/sand, based on various input signals, 22 denotes a boom angle sensor for measuring the angle of rotation of the boom 11 relative to a supporting pin attached to the base of the boom 11, 23 denotes an arm angle sensor for measuring the angle of rotation of the arm 13 relative to a supporting pin attached to the distal end of the boom 11, 25 denotes a bucket angle sensor for detecting the angle of rotation of the bucket 15, and 24 denotes a swing angle sensor for measuring the swing angle of the swing device 17 which swings the revolving superstructure 2. Also, reference numeral 28 denotes a release position teaching button for setting a position (release position) where the mineral ore or earth/sand is to be released from the bucket 15, and 29 denotes a distance sensor (transportation vehicle detecting means) arranged at a front part of the hydraulic excavator 1 for detecting the distance to the dump truck 3.

Reference numeral 26 denotes a display device (weight display means) for displaying the weight of the mineral ore or earth/sand calculated by the load measuring unit 27. Specifically, the display device 26 is constituted by three display sections, namely, a current load display section 26a, a determined load display section 26b, and a total load display section 26c.

The load measuring unit 27 is input with various signals, which include a bucket dump operation signal S1 from the sensor 201, a right swing signal S2 and a left swing signal S3 from the sensor 202, a boom bottom pressure signal S4 from the pressure sensor 123, a boom rod pressure signal S5 from the pressure sensor 124, an arm bottom pressure signal S6 from the pressure sensor 143, an arm rod pressure signal S7 from the pressure sensor 144, a bucket bottom pressure signal S8 from the pressure sensor 163, a bucket rod pressure signal S9 from the pressure sensor 164, a boom angle signal S10 from the boom angle sensor 22, an arm angle signal S11 from the arm angle sensor 23, a swing angle signal S12 from the swing angle sensor 24, a bucket angle signal S13 from the bucket angle sensor 25, and a distance signal S14 from the distance sensor 29. Based on these signals, the load measuring unit 27 computes the load in the bucket 15, that is, the weight of mineral ore or earth/sand scooped in the bucket 15, and outputs the resultant data S15 indicative of the computed weight to the display device 26.

Figure 3:
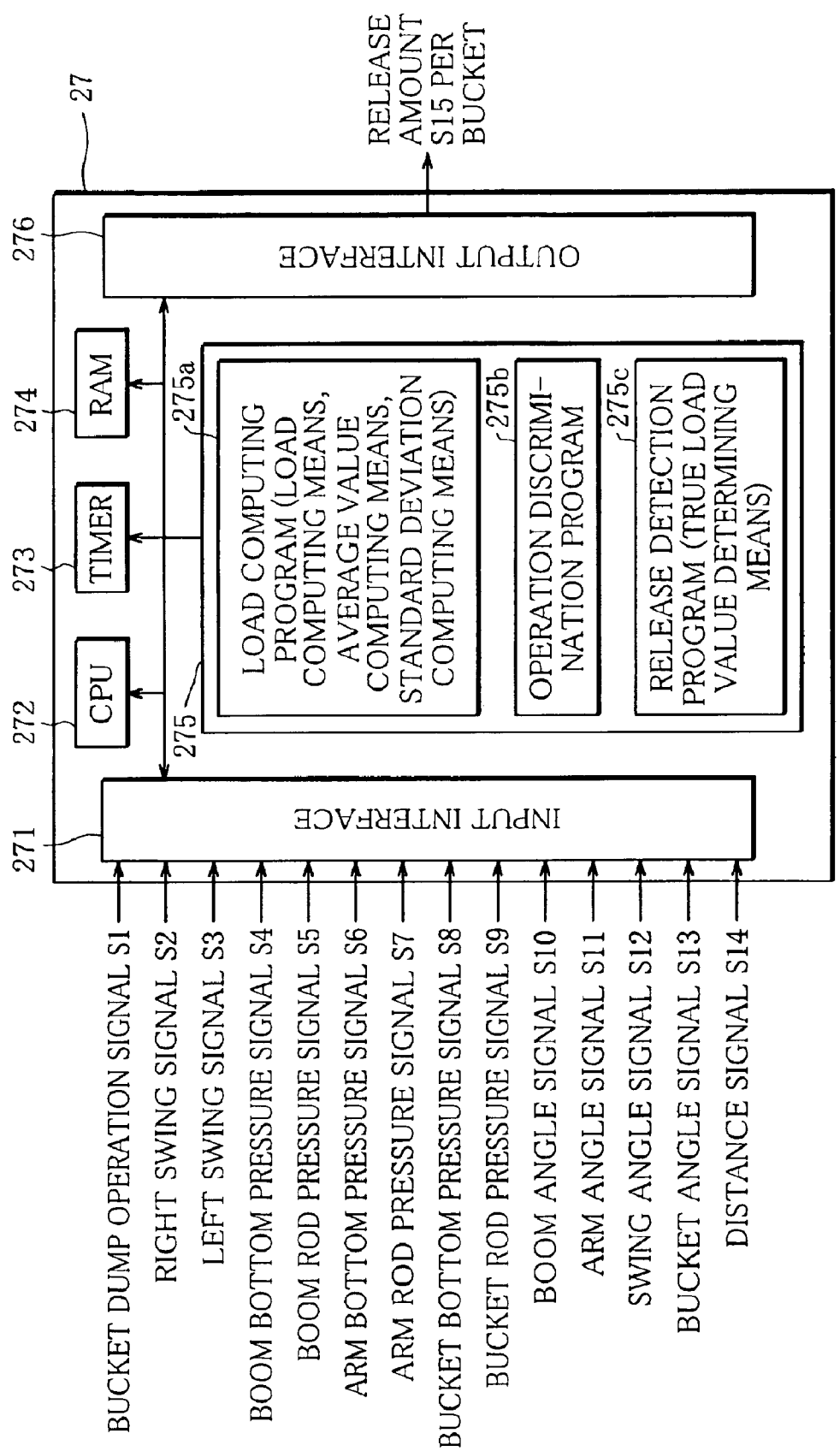
FIG. 3 is a diagram showing a configuration of a load measuring unit according to the present invention.

FIG. 3 shows a configuration of the load measuring unit 27 according to the present invention, appearing in FIG. 2.

The load measuring unit 27 comprises a computer as its principal component. In the figure, reference numeral 271 denotes an input interface provided with A/D converters for receiving the various input signals, 272 denotes a central processing unit (CPU) for performing various computations and control operations, 273 denotes a timer for outputting a pulse signal with a fixed period, 274 denotes a random access memory (RAM) for storing results of computations, 275 denotes a read only memory (ROM) storing various processing programs to be executed by the CPU 272, and 276 denotes an output interface for outputting various data to the display device 26.

Specifically, the ROM 275 stores a load computing program 275a, an operation discrimination program 275b, and a release detection program 275c.

Operation of the present invention configured as above will be now described.

Figure 4:
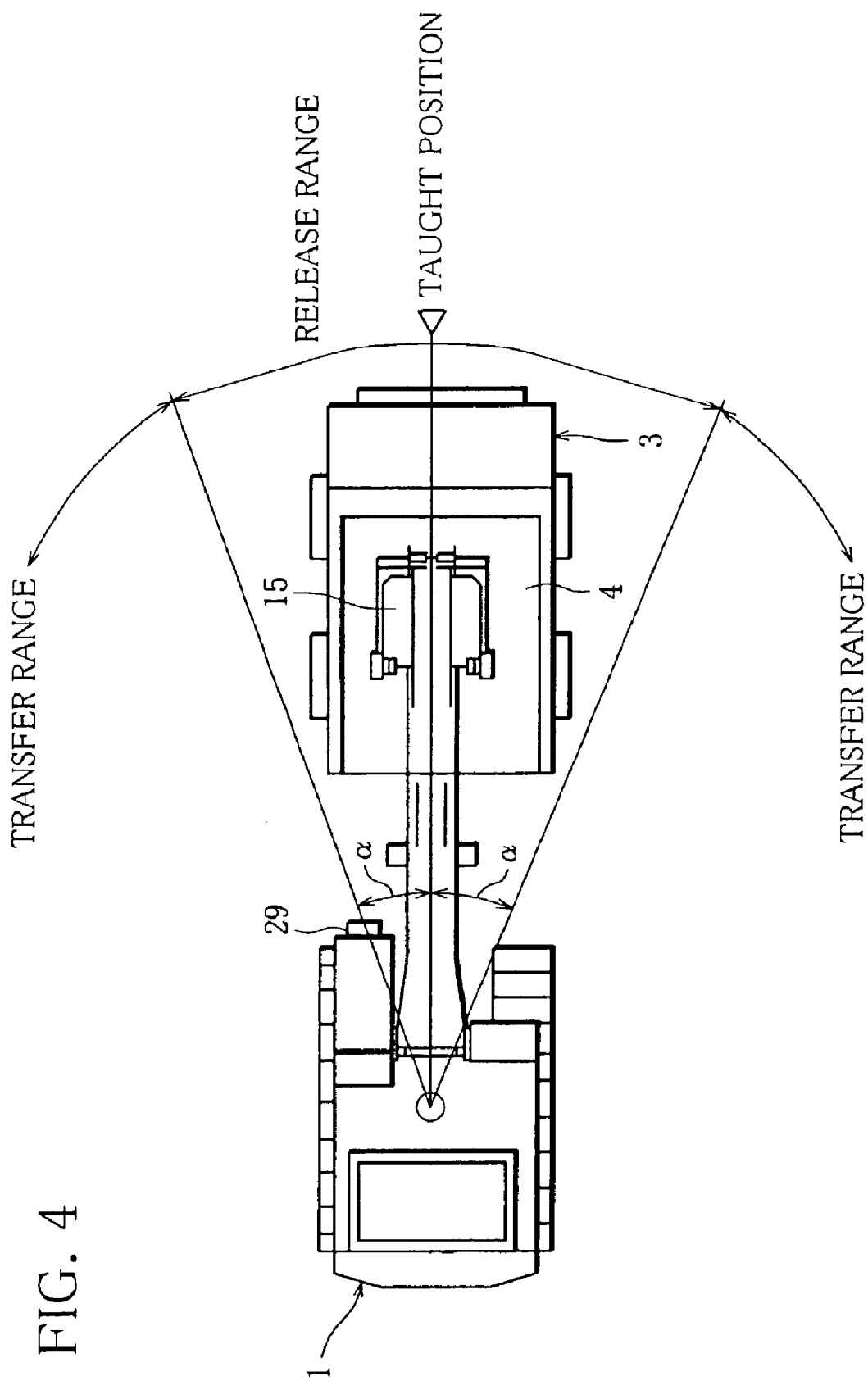
FIG. 4 is a view illustrating examples of release and transfer ranges according to the present invention.
Figure 5:
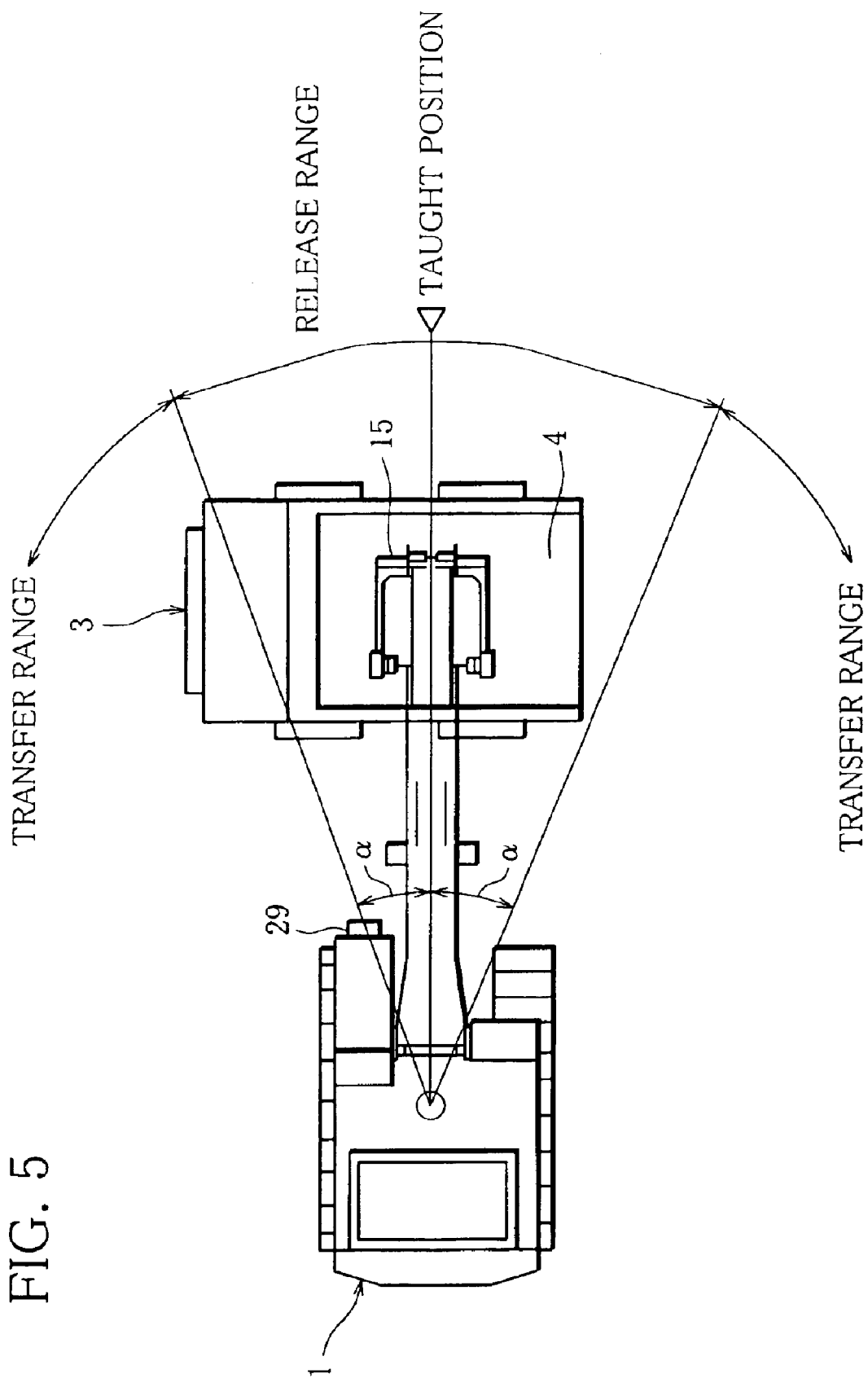
FIG. 5 is a view illustrating other examples of release and transfer ranges according to the present invention.

FIGS. 4 and 5 illustrate release ranges used in the operation discrimination program 275b according to the present invention. The release range is defined as a swing angle of ±α whose bisector coincides with a taught position taught by means of the release position teaching button 28. Outside the release range is a transfer range. FIG. 4 illustrates the case where the dump truck 3 is stopped with its rear facing the hydraulic excavator 1, and FIG. 5 illustrates the case where the dump truck is stopped with its one side facing the excavator. Whichever direction the dump truck 3 is oriented, the dump truck is judged to be stopped at a proper position near the taught position insofar as the distance signal S14 from the distance sensor 29 shows a distance falling within a predetermined range.

Figure 6:
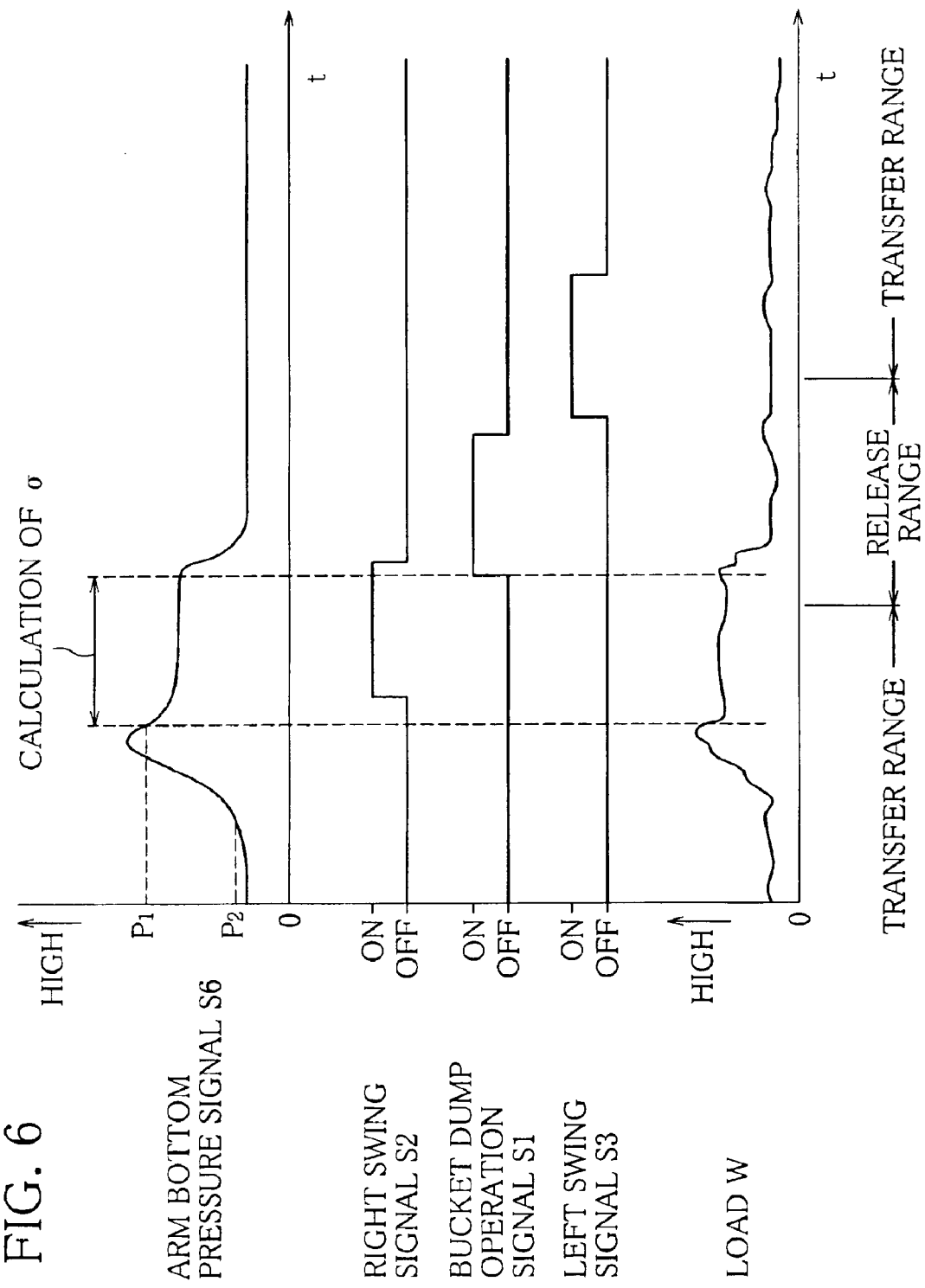
FIG. 6 is a time chart illustrating examples of a swing signal, bucket dump operation signal and load W which are input to the load measuring unit of the present invention.

FIG. 6 is a time chart exemplifying the arm bottom pressure signal S6, swing signals S2 and S3, bucket dump operation signal S1 and load W, all input to the load measuring unit 27 of the present invention.

In the illustrated example, the right swing signal S2 turns ON and thus the hydraulic excavator 1 swings rightward from the excavation position to the vessel 4 of the dump truck 3, whereupon it is judged by the operation discrimination program 275b that the boom 11 has entered the release range from the transfer range. Subsequently, the bucket dump operation signal S1 turns ON, so that the hydraulic excavator 1 loads the dump truck 3 with mineral ore or earth/sand. After the loading is completed, the left swing signal S3 turns ON and thus the hydraulic excavator 1 swings leftward to the excavation position, whereupon it is judged that the boom 11 has left the release range and entered the transfer range. Alternatively, the hydraulic excavator 1 may be operated to swing rightward after the loading.

The load W indicates the weight of mineral ore or earth/sand scooped in the bucket 15. The load W is computed at regular intervals by the load computing program 275a, following a calculation method (load computing means, load computing step) explained below, for example.

A force exerted to support the boom 11, the arm 13 and the bucket 15 containing mineral ore or earth/sand can be obtained from the boom bottom pressure signal S4 and the boom rod pressure signal S5 input to the load measuring unit 27, or from the arm bottom pressure signal S6 and the arm rod pressure signal S7 input to the unit 27. Also, the centers of gravity of the boom 11, arm 13 and bucket 15 can be calculated from the boom angle signal S10, the arm angle signal S11 and the bucket angle signal S13. Thus, the moment around the supporting pin attached to the base of the boom 11 can be obtained from the calculated centers of gravity and the known weights of the boom 11, arm 13 and empty bucket 15. Then, the weight of the mineral ore or earth/sand contained in the bucket 15 is calculated in consideration of the equilibrium between the aforementioned supporting force and the moment around the supporting pin attached to the base of the boom 11. During swinging motion, the calculated weight is corrected using a centrifugal force corresponding to the swing speed. This calculation method is known in the art, as disclosed in Examined Japanese Patent Publication No. H04-44930.

In the example shown in FIG. 6, during the rightward swinging motion, the load W shows a large value because the boom 11 is then swinging toward the vessel 4 of the dump truck 3 after scooping mineral ore or earth/sand at the excavation position. During the leftward swinging motion, on the other hand, the load W shows a small value because the boom 11 is then returning to the excavation position after loading the mineral ore or earth/sand onto the dump truck 3.

Figure 7:
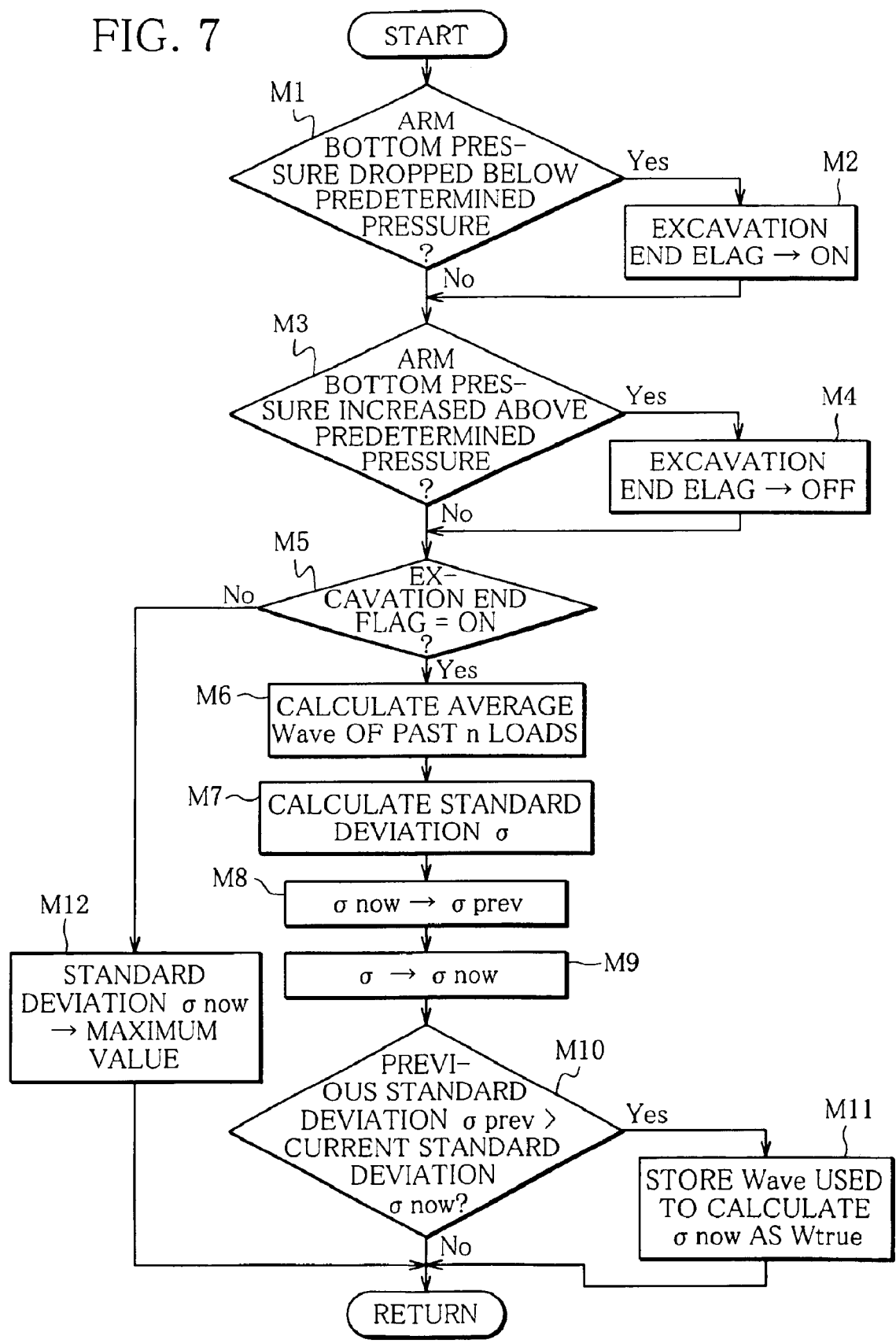
FIG. 7 is a flowchart showing a control routine for a load computing program and an operation discrimination program according to the present invention.
Figure 8:
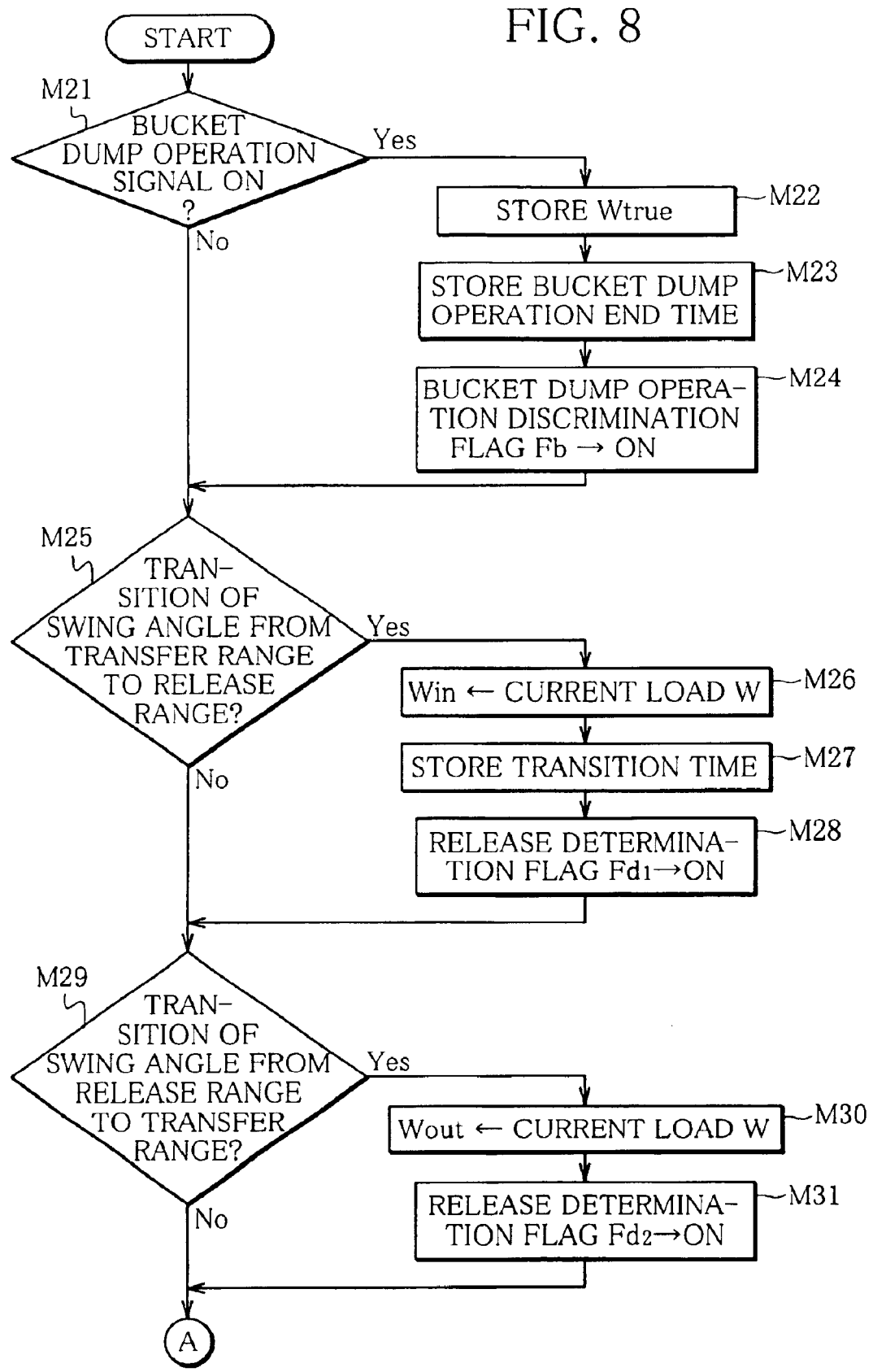
FIG. 8 is a part of a flowchart showing a control routine for the operation discrimination program and a release detection program according to the present invention.
Figure 9:
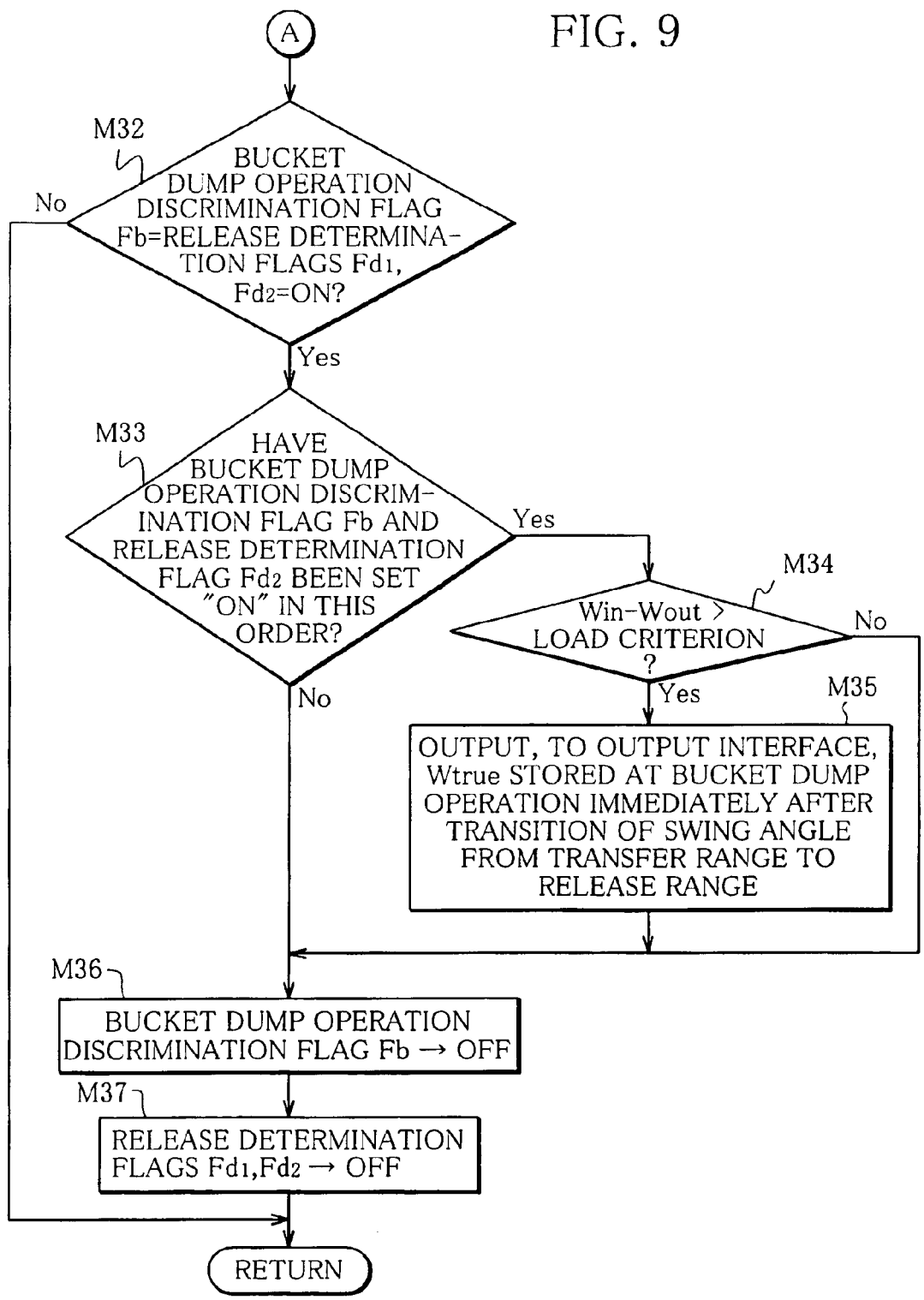
FIG. 9 is the remaining part of the flowchart continued from the part of FIG. 8, showing the control routine for the operation discrimination program and the release detection program according to the present invention.

FIGS. 7 to 9 are flowcharts illustrating control routines for the load computing program 275a, the operation discrimination program 275b and the release detection program 275c according to the present invention. In the following, the invention will be described with reference to the flowcharts.

In Step M1 in FIG. 7, it is determined based on the arm bottom pressure signal S6, shown in FIG. 6, whether or not the arm bottom pressure has decreased from a level higher than a predetermined pressure $P_1$ down to a level lower than the pressure $P_1$. If the decision is affirmative (Yes), it is judged that excavation has ended; therefore, an excavation end flag is set ON in Step M2, and the routine proceeds to Step M3. If the decision is negative (No), it is judged that excavation or some other operation is in process, and the routine directly proceeds to Step M3.

In Step M3, it is determined whether or not the arm bottom pressure has increased from a level lower than a predetermined pressure $P_2$ up to a level higher than the pressure $P_2$. If the decision is affirmative (Yes), it is judged that excavation has been started; therefore, the excavation end flag is set OFF in Step M4, and the routine proceeds to Step M5. If the decision is negative (No), it is judged that excavation or some other operation is in progress, and the routine directly proceeds to Step M5.

In Step M5, it is determined whether or not the excavation end flag is ON (transfer start detecting means, transfer start detecting step). If the decision is affirmative (Yes) and thus the flag is ON, that is, if the arm bottom pressure has decreased from above the predetermined pressure $P_1$ to a level lower than the pressure $P_1$, it can be concluded that excavation has ended. In this case, an average value $W_{ave}$ of n loads W (n=predetermined number) detected in the past is calculated (average value computing means, average value computing step), in Step M6. Then, in Step M7, a standard deviation σ is calculated from the average load $W_{ave}$ and a currently detected load W (standard deviation computing means, standard deviation computing step), according to the following equation (1):

$$\sigma = (1/(n-1)\Sigma(W_i - W_{ave})^2)^{1/2} \qquad (1)$$

where $W_i$ represents each of n loads W calculated in the past (i=1, ..., n).

Thus, the standard deviation is repeatedly calculated while updating the load W each time the load W is calculated. The calculation of the standard deviation σ is repeated until a bucket dump operation is performed following the transfer of mineral ore or earth/sand, that is, over the longest possible transfer period until the bucket dump operation signal S1 is detected and thus the scooped mineral ore or earth/sand is released (see FIG. 6).

In Step M8, the previously calculated standard deviation $\sigma_{now}$ is substituted for a previous standard deviation $\sigma_{prev}$, and in Step M9, the standard deviation σ calculated in Step M7 is set as the new current standard deviation $\sigma_{now}$.

Then, in Step M10, the previous standard deviation $\sigma_{prev}$ and the current standard deviation $\sigma_{now}$ are compared with each other, to determine a minimum standard deviation $\sigma_{min}$ (true load value determining means, true load value determining step). If the decision is affirmative (Yes), that is, if the standard deviation $\sigma_{now}$ is smaller and thus judged to be the minimum standard deviation $\sigma_{min}$, the average load $W_{ave}$ used to calculate the standard deviation $\sigma_{now}$ is stored as a true load $W_{true}$, in Step M11. If the decision is negative (No) and the previous standard deviation $\sigma_{prev}$ is smaller, the routine is ended.

If the decision in Step M5 is negative (No) and the flag is OFF, it can be concluded that excavation is not finished yet.

In this case, the standard deviation $\sigma_{now}$ is set to a maximum value, followed by termination of the routine.

While the distance signal S14 from the distance sensor 29 shows a distance falling within the predetermined range, it is judged that the dump truck 3 is located in a proper position and thus that the vessel 4 can be loaded with material. In this case, in Step M21 in FIG. 8, it is determined based on the bucket dump operation signal S1 whether or not bucket dump operation has been started to release the material. In the case where the bucket operation lever 20 is a hydraulic pilot type, the bucket dump operation signal S1 is detected by determining whether or not the level of the pressure signal has exceeded a fixed value, and where the bucket operation lever 20 is an electric lever, the bucket dump operation signal is detected by determining whether or not the level of the voltage signal has exceeded a fixed value (transfer end detecting means, transfer end detecting step).

If the decision in Step M21 is affirmative (Yes) and thus bucket dump operation has been started, the current true load $W_{true}$ stored in Step M11 is acquired as an average load associated with the minimum standard deviation $\sigma_{min}$ at the start of bucket dump operation, in Step M22. Subsequently, in Step M23, an end time of the bucket dump operation is acquired. Then, in Step M24, a bucket dump operation discrimination flag $F_b$ is set ON, and the routine proceeds to Step M25. On the other hand, if the decision in Step M21 is negative (No) and it is judged that no bucket dump operation is being performed, the routine directly proceeds to Step M25.

In practice, the acquisition of the true load $W_{true}$ at the start of the bucket dump operation and the acquisition of the end time of the bucket dump operation are performed within bucket dump operation discriminating means, not shown. Accordingly, the true load $W_{true}$ and the bucket dump operation end time acquired in this manner are used in Steps M22 and M23, respectively.

In Step M25, it is determined whether or not a transition of the swing angle from the transfer range to the release range has occurred. If the swing angle has entered the release range, the load W then measured is stored as a load $W_{in}$, in Step M26. Subsequently, in Step M27, the time of the transition is stored, and in Step M28, a release determination flag $F_{d1}$ is set ON. If the decision in Step M25 is negative (No) and thus it is judged that the transition of the swing angle from the transfer range to the release range has not occurred, the routine directly proceeds to Step M29.

In Step M29, it is determined whether or not a transition of the swing angle from the release range to the transfer range has occurred. If the swing angle has entered the transfer range, the load W then measured is stored as a load $W_{out}$, in Step M30. Subsequently, in Step M31, a release determination flag $F_{d2}$ is set ON, and the routine proceeds to the next step. On the other hand, if the decision in Step M29 is negative (No) and it is judged that the transition of the swing angle from the release range to the transfer range has not occurred, the routine directly proceeds to Step M32.

In Step M32 in FIG. 9, it is determined whether all of the bucket dump operation discrimination flag $F_b$ and release determination flags $F_{d1}$ and $F_{d2}$ are ON or not. If the decision is affirmative (Yes) and thus all of the flags are ON, the routine proceeds to Step M33. If the decision is negative (No), the routine is ended.

In Step M33, the order in which the flags were set ON is determined. If the bucket dump operation discrimination flag $F_b$ and the release determination flag $F_{d2}$ were set ON in this order, it can be concluded that the swing angle has entered the transfer range after bucket dump operation was performed in the release range. In this case, the routine proceeds to Step M34.

In Step M34, whether mineral ore or earth/sand as the scooped material has actually been released or not is determined by comparing the difference between the loads $W_{in}$ and $W_{out}$, stored beforehand, with a load criterion. The load criterion may be "0" or be set to a certain value at and above which the load W is to be judged effective. If the decision is affirmative (Yes) and it is judged that the scooped material has been released, the routine proceeds to Step M35.

In Step M35, the bucket dump operation end time stored in Step M23 is compared with the time stored in Step M27, that is, the time of the transition of the swing angle from the transfer range to the release range, and the true load $W_{true}$ which was stored at the time of the bucket dump operation immediately after the transition is output to the output interface 276 as the weight of the material released onto the vessel 4 of the dump truck 3.

The signal output to the output interface 276 is supplied to the display device 26, and an integrated value of the true loads $W_{true}$ is displayed at the determined load display section 26b which is adapted to display an integrated value of the true loads obtained over a period from the time the release position is taught until the next release position is taught. In the case where the position of the dump truck 3 is automatically determined by the distance sensor 29, the release position teaching button 28 need not be pressed, and besides, the integrated value of the true loads $W_{true}$ is displayed at the determined load display section 26b over a period from the time the arrival of the dump truck 3 is detected until the dump truck 3 leaves the loading position. This permits the operator to be notified of the amount of the material loaded onto the dump truck 3, making it possible to prevent overloading.

A signal indicative of the aforementioned average load $W_{ave}$ is also successively output to the display device 26, and the average load $W_{ave}$ is displayed at the current load display section 26a.

Also, the total load display section 26c displays an integrated value of the true loads $W_{true}$ calculated over a predetermined work shift period from the time an engine ignition key, not shown, of the hydraulic excavator 1 is turned ON until the engine ignition key is turned OFF. Data on the integrated value of the true loads $W_{true}$ can be transferred to outside through the output interface 276, for example, and also can be cleared by pressing a reset button, not shown, for every work shift.

After the true load $W_{true}$ is output, the bucket dump operation discrimination flag $F_b$ is set OFF in Step M36, and the release determination flags $F_{d1}$ and $F_{d2}$ are set OFF in Step M37, followed by termination of the routine. If the condition in Step M35 fails to be fulfilled, it is judged that no release of material onto the dump truck 3 took place, and the routine is ended after executing Steps M36 and M37.

Thus, according to the present invention, the excavation and release operation of the hydraulic excavator 1 are automatically detected, and an average load $W_{ave}$ obtained during a period in which the standard deviation $\sigma$ of detected loads shows a minimum standard deviation $\sigma_{min}$ and thus the load W is most stable over a wide range from the end of excavation to the start of release operation is judged to be a true value of the load such as mineral ore or earth/sand, that is, the true load $W_{true}$. Accordingly, the load W such as mineral ore or earth/sand released from the hydraulic excavator 1 onto the vessel 4 of the dump truck 3 can be accurately measured, without being influenced by the operation (boom moving speed, arm moving speed, bucket height, etc.) of the hydraulic excavator 1 during the transfer of the scooped material to the dump truck 3. This not only permits an accurate load W to be displayed at the display device 26, making it easy for the operator to ascertain the accurate load W, but also permits the true load $W_{true}$ to be integrated for each work shift, thus enabling a supervisor etc. to manage the output of mineral ore or earth/sand with accuracy.

Further, it is confirmed by means of the distance sensor 29 that the dump truck 3 is located at a proper position close to the taught position, before mineral ore or earth/sand is loaded onto the vessel 4. It is therefore possible to calculate the amount of load on the dump truck 3 with accuracy and also to easily manage an actual output of mineral ore or earth/sand, without the need for the operator to press the release position teaching button 28.

While the preferred embodiment has been described, the present invention is not limited to the foregoing embodiment.

Figure 10:
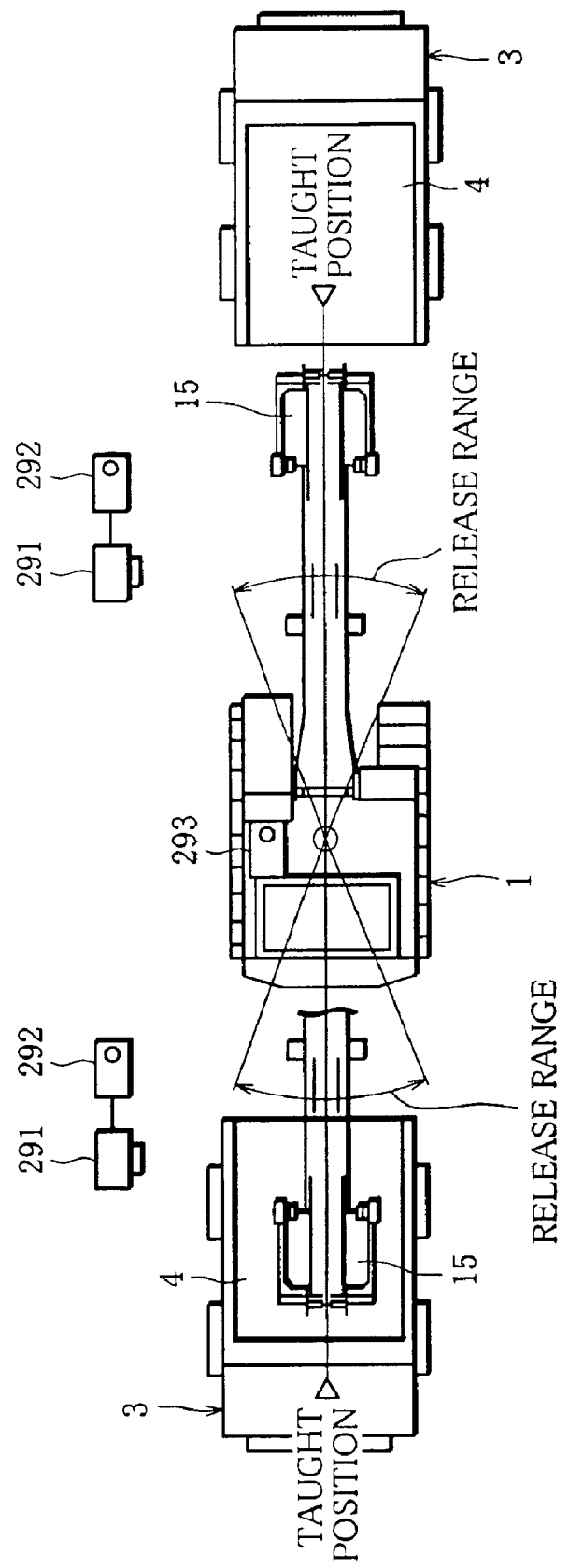
FIG. 10 is a view illustrating an exemplary arrangement according to the present invention wherein distance sensors are installed on the ground.
Figure 11:
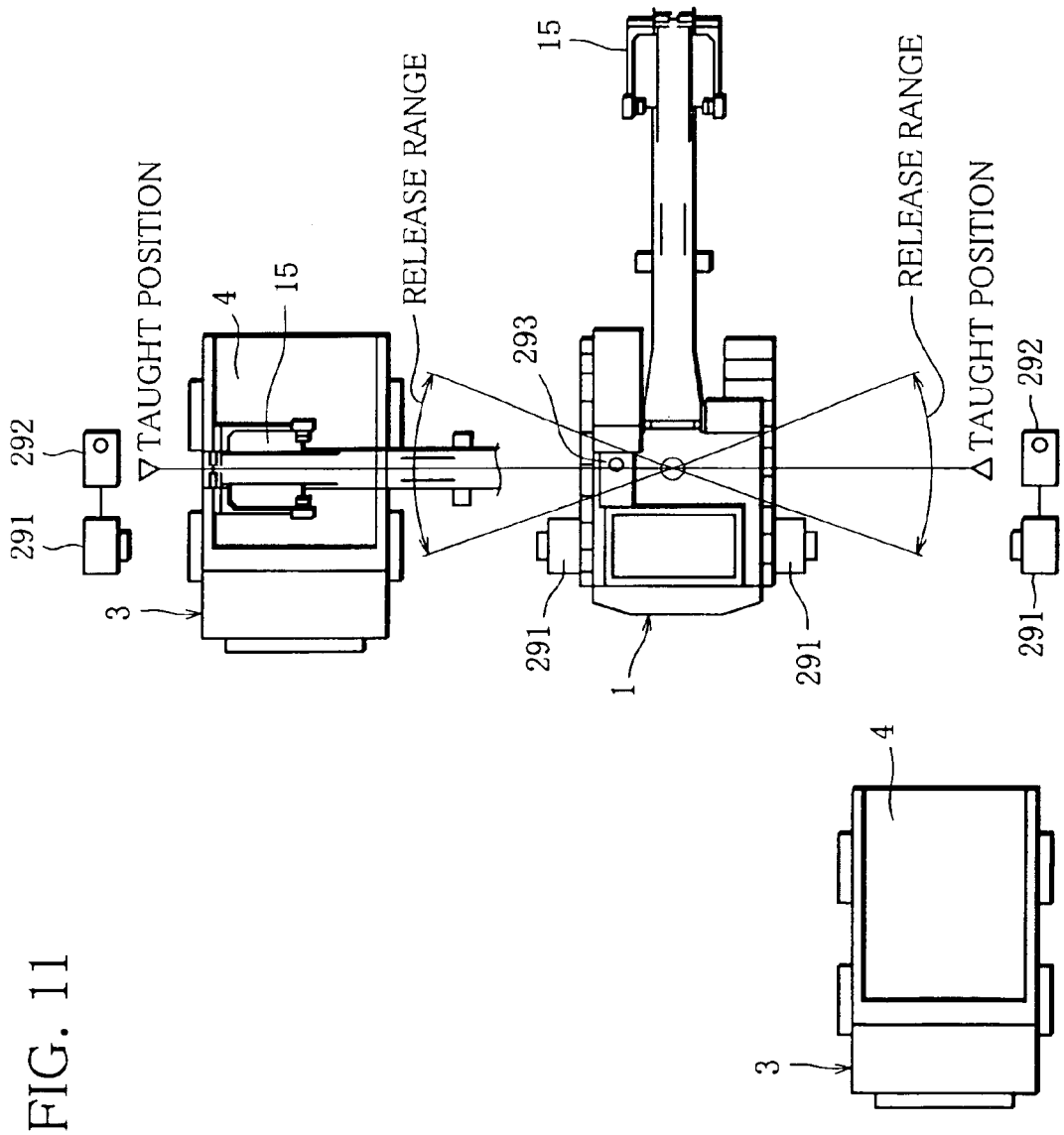
FIG. 11 is a view illustrating another exemplary arrangement according to the present invention wherein the distance sensors are installed on the ground.

For example, in the foregoing embodiment, the distance sensor 29 is arranged at the front part of the hydraulic excavator 1. Alternatively, as shown in FIGS. 10 and 11, distance sensors 291 may be arranged on the ground at locations suited for the position and orientation of the stopped dump truck 3, and detection signals transmitted from radio transmitters 292 may be received by a receiver 293 attached to the hydraulic excavator 1.

Figure 12:
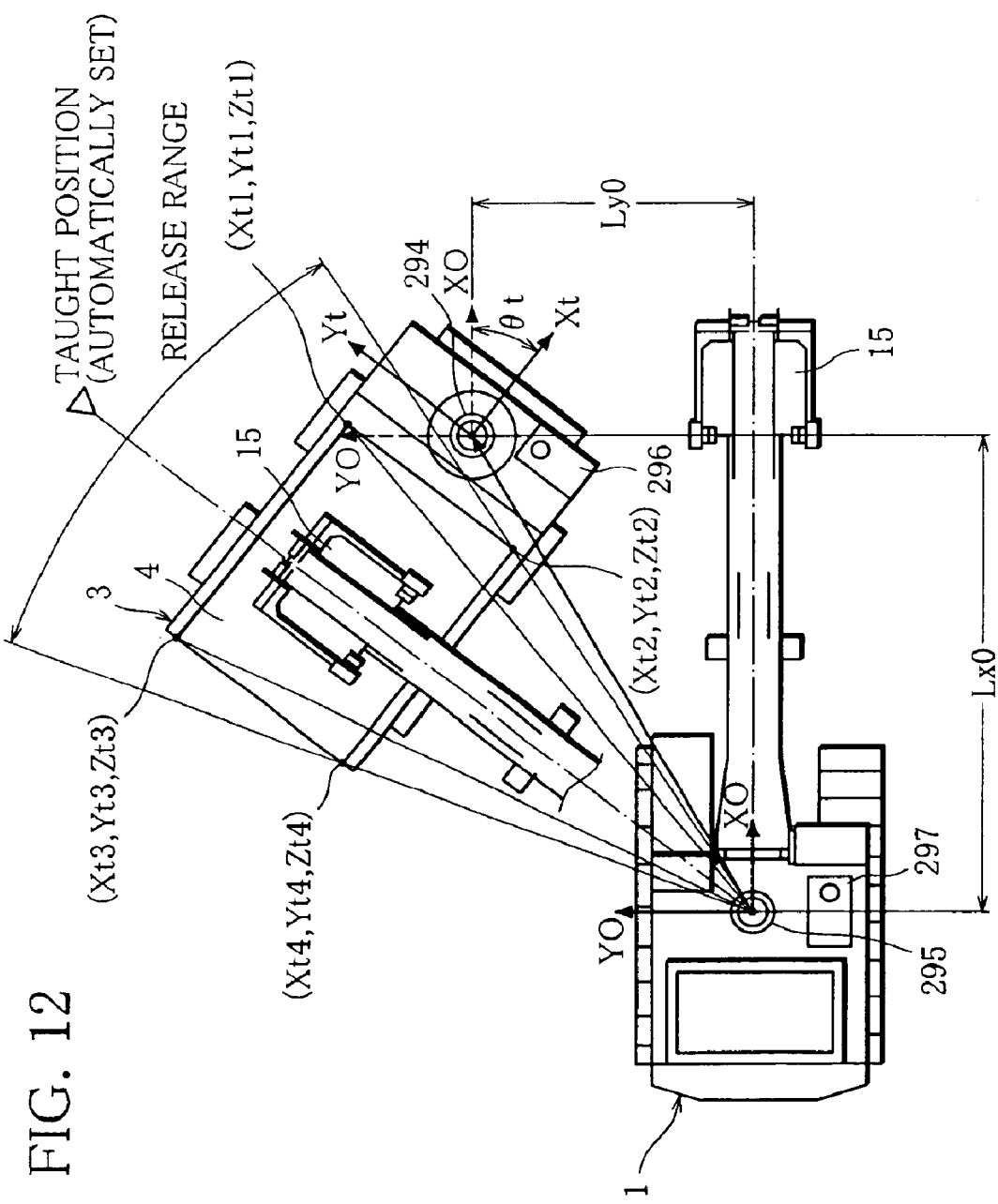
FIG. 12 is a view illustrating an exemplary arrangement according to the present invention wherein GPS units are used in place of the distance sensors.

Further, as shown in FIG. 12, the hydraulic excavator 1 and the dump truck 3 may both be equipped with GPS units 295 and 294, respectively, so that a position detection signal transmitted from a radio transmitter 296 mounted on the dump truck 3 may be received by a receiver 297 mounted on the hydraulic excavator 1, to detect a relative position between the excavator 1 and the dump truck 3. With this arrangement, the relative position between the hydraulic excavator 1 and the dump truck 3 can be obtained, as distinct from the case of using the distance sensor. It is therefore possible to ascertain whether the dump truck 3 is stopped at a proper position or not based on, for example, the distance between the GPS units 294 and 295 obtained from distances $L_{x0}$ and $L_{y0}$ shown in FIG. 12, and a relative angle $\theta_r$. It is also possible to accurately locate the vessel 4 based on information about the vessel corner positions $\{(X_{t1}, Y_{t1}, Z_{t1}), (X_{t2}, Y_{t2}, Z_{t2}), (X_{t3}, Y_{t3}, Z_{t3}) (X_{t4}, Y_{t4}, Z_{t4})\}$. In the case of using the GPS units 294 and 295, therefore, the taught position can be automatically set, and it is possible to calculate the amount of load on the dump truck 3 with accuracy and also to easily manage an actual output of mineral ore or earth/sand, without the need for the operator to press the release position teaching button 28.

Also, in the foregoing embodiment, bucket dump operation is detected based on the bucket dump operation signal S1 from the sensor 201 connected to the bucket operation lever 20. Alternatively, an angle sensor for detecting the bucket swing angle or a displacement sensor for detecting the displacement of the bucket cylinder 16 may be used so that bucket dump operation may be detected based on information from the angle sensor or the displacement sensor.

In the above embodiment, the standard deviation $\sigma$ is obtained, but $\sigma^2$ may be derived instead because the aim of calculating $\sigma$ is to obtain dispersion of the load W.

Further, in the foregoing embodiment, the end of excavation is detected based on the arm bottom pressure signal S6, but may alternatively be detected based on the bucket bottom pressure signal S8. Moreover, in the case where the arm cylinder 14 is inversely mounted to the hydraulic excavator 1, the arm rod pressure signal S7 is used to detect the end of excavation, and where the bucket cylinder 16 is inversely mounted, the bucket rod pressure signal S9 is used to detect the end of excavation.

Figure 13:
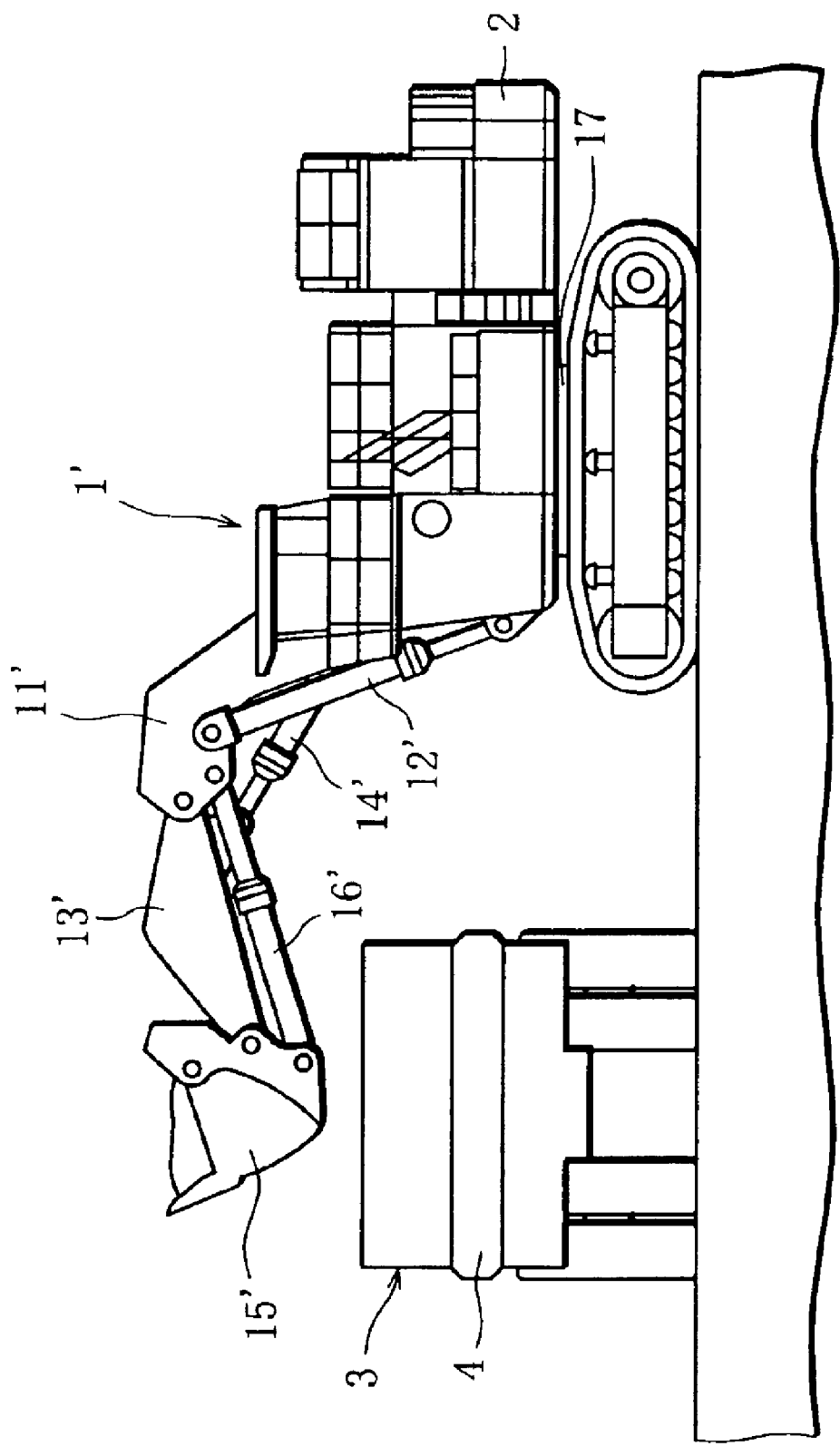
FIG. 13 is a view illustrating an example of application of the present invention to a loading shovel-type hydraulic excavator.

In the above embodiment is described the backhoe type hydraulic excavator 1 by way of example. It is to be noted that the present invention is also suitably applicable to a loading shovel type hydraulic excavator 1' shown in FIG. 13. In the figure, reference numeral 12' denotes a boom cylinder for raising and lowering a boom 11' of the loading shovel type hydraulic excavator 1', 14' denotes an arm cylinder for swinging an arm 13', and 16' denotes a bucket cylinder for swinging a bucket 15'. Thus, the true load $W_{true}$ can be obtained, like the foregoing embodiment, by detecting the boom bottom pressure and boom rod pressure of the boom cylinder 12', the arm bottom pressure and arm rod pressure of the arm cylinder 14', the boom angle, the arm angle and the bucket angle. Also in this case, the load W of mineral ore or earth/sand released from the hydraulic excavator 1 onto the vessel 4 of the dump truck 3 can be measured with accuracy.

Furthermore, in the above embodiment, the position (release range) for releasing mineral ore or earth/sand from the bucket 15 and the transfer range are set in two dimensions by the release position teaching button 28. The present invention is, however, not limited to such range setting and may be configured so as to set the release and transfer ranges in three dimensions (in the height direction as well). In this case, the present invention can cope with a situation where the vessels 4 of dump trucks 3 are at different heights from the ground, for example.

What is claimed is:

1. A work amount detection device for a hydraulic excavator which scoops a material with a bucket thereof and transfers the material to a different location, said work amount detection device comprising:

transfer start detecting means for detecting start of the transfer of the material to the different location;

transfer end detecting means for detecting end of the transfer of the material to the different location;

load computing means for periodically computing weight of the material in the bucket during the transfer;

average value computing means for computing an average value of weights of the material periodically computed by said load computing means, the weights of the material including a currently computed weight and a predetermined number of weights computed prior to the currently computed weight;

standard deviation computing means for computing, based on the average value computed by said average value computing means, a standard deviation of the weights of the material including the currently computed weight and the predetermined number of weights computed prior to the currently computed weight; and true load value determining means for selecting a minimum standard deviation from among the standard deviations computed by said standard deviation computing means from the start of the transfer of the material to the different location until the end of the transfer of same, and judging the average value based on which the minimum standard deviation was computed, to be a true value of the weight of the material.

2. The work amount detection device according to claim 1, wherein said transfer start detecting means detects, as the start of the transfer, completion of scooping of the material with the bucket, and said transfer end detecting means detects, as the end of the transfer, bucket dump operation.

3. A work amount detection device for a hydraulic excavator which scoops a material with a bucket thereof and transfers the material to a transportation vehicle, said work amount detection device comprising:

teaching means for teaching a position for the transportation vehicle;

transportation vehicle detecting means for detecting the transportation vehicle when the transportation vehicle is located at the position taught by said teaching means;

transfer start detecting means for detecting start of the transfer of the material to the transportation vehicle;

transfer end detecting means for detecting end of the transfer of the material to the transportation vehicle;

load computing means for periodically computing weight of the material in the bucket during the transfer;

average value computing means for computing an average value of weights of the material periodically computed by said load computing means, the weights of the material including a currently computed weight and a predetermined number of weights computed prior to the currently computed weight;

standard deviation computing means for computing, based on the average value computed by said average value computing means, a standard deviation of the weights of the material including the currently computed weight and the predetermined number of weights computed prior to the currently computed weight; and true load value determining means for selecting a minimum standard deviation from among the standard deviations computed by said standard deviation computing means from the start of the transfer of the material to the transportation vehicle until the end of the transfer of same, and judging the average value based on which the minimum standard deviation was computed, to be a true value of the weight of the material.

4. A work amount detection method for a hydraulic excavator which scoops a material with a bucket thereof and transfers the material to a different location, said work amount detection method comprising:

a transfer start detecting step of detecting start of the transfer of the material to the different location;

a transfer end detecting step of detecting end of the transfer of the material to the different location;

a load computing step of periodically computing weight of the material in the bucket during the transfer;

an average value computing step of computing an average value of weights of the material periodically computed in said load computing step, the weights of the material including a currently computed weight and a predetermined number of weights computed prior to the currently computed weight;

a standard deviation computing step of computing, based on the average value computed in said average value computing step, a standard deviation of the weights of the material including the currently computed weight and the predetermined number of weights computed prior to the currently computed weight; and a true load value determining step of selecting a minimum standard deviation from among the standard deviations computed in said standard deviation computing step from the start of the transfer of the material to the different location until the end of the transfer of same, and judging the average value based on which the minimum standard deviation was computed, to be a true value of the weight of the material.

5. The work amount detection method according to claim 4, wherein in said transfer start detecting step, completion of scooping of the material with the bucket is detected as the start of the transfer, and in said transfer end detecting step, bucket dump operation is detected as the end of the transfer.

6. A work amount detection result display device for a hydraulic excavator which scoops a material with a bucket thereof and transfers the material to a different location, said work amount detection result display device comprising:

transfer start detecting means for detecting start of the transfer of the material to the different location;

transfer end detecting means for detecting end of the transfer of the material to the different location;

load computing means for periodically computing weight of the material in the bucket during the transfer;

average value computing means for computing an average value of weights of the material periodically computed by said load computing means, the weights of the material including a currently computed weight and a predetermined number of weights computed prior to the currently computed weight;

standard deviation computing means for computing, based on the average value computed by said average value computing means, a standard deviation of the weights of the material including the currently computed weight and the predetermined number of weights computed prior to the currently computed weight;

true load value determining means for selecting a minimum standard deviation from among the standard deviations computed by said standard deviation computing means from the start of the transfer of the material to the different location until the end of the transfer of same, and judging the average value based on which the minimum standard deviation was computed, to be a true value of the weight of the material; and weight display means for displaying at least an integrated value of the true values determined by said true load value determining means over a predetermined period.

7. The work amount detection result display device according to claim 6, wherein said weight display means displays an integrated value of the true values determined by said true load value determining means over a period from the time an engine ignition key of the hydraulic excavator is turned ON until the engine ignition key is turned OFF.

8. The work amount detection result display device according to claim 6, wherein said weight display means additionally displays the average value of the weights of the material computed by said average value computing means.

9. The work amount detection result display device according to claim 6, wherein said transfer start detecting means detects, as the start of the transfer, completion of scooping of the material with the bucket, and said transfer end detecting means detects, as the end of the transfer, bucket dump operation.

10. A work amount detection result display device for a hydraulic excavator which scoops a material with a bucket thereof and transfers the material to a transportation vehicle, said work amount detection result display device comprising:

teaching means for teaching a position for the transportation vehicle;

transportation vehicle detecting means for detecting the transportation vehicle when the transportation vehicle is located at the position taught by said teaching means;

transfer start detecting means for detecting start of the transfer of the material to the transportation vehicle;

transfer end detecting means for detecting end of the transfer of the material to the transportation vehicle;

load computing means for periodically computing weight of the material in the bucket during the transfer;

average value computing means for computing an average value of weights of the material periodically computed by said load computing means, the weights of the material including a currently computed weight and a predetermined number of weights computed prior to the currently computed weight;

standard deviation computing means for computing, based on the average value computed by said average value computing means, a standard deviation of the weights of the material including the currently computed weight and the predetermined number of weights computed prior to the currently computed weight;

true load value determining means for selecting a minimum standard deviation from among the standard deviations computed by said standard deviation computing means from the start of the transfer of the material to the transportation vehicle until the end of the transfer of same, and judging the average value based on which the minimum standard deviation was computed, to be a true value of the weight of the material; and weight display means for displaying at least an integrated value of the true values determined by said true load value determining means over a period for which the transportation vehicle located at the taught position is continuously detected by said transportation vehicle detecting means.

* * * * *